United States Patent [19]

Suzuki et al.

[11] Patent Number: 5,385,193
[45] Date of Patent: Jan. 31, 1995

[54] MOTORCYCLE RADIAL TIRE HAVING A SPIRALLY WOUND BELT

[75] Inventors: Shigehiko Suzuki, Amagasaki; Itsuo Yasui, Nishinomiya, both of Japan

[73] Assignee: Sumitomo Rubber Industries, Ltd., Hyogo, Japan

[21] Appl. No.: 180,500

[22] Filed: Jan. 12, 1994

Related U.S. Application Data

[63] Continuation of Ser. No. 775,109, Oct. 11, 1991, abandoned.

[30] Foreign Application Priority Data

Oct. 29, 1990 [JP] Japan ................... 2-292528
Sep. 26, 1991 [JP] Japan ................... 3-276943

[51] Int. Cl.⁶ .................. B60C 9/18; B60C 9/20; B60C 13/00; B60C 15/06
[52] U.S. Cl. ................... 152/525; 152/526; 152/527; 152/531; 152/533; 152/546; 152/554; 152/555
[58] Field of Search .............. 152/527, 531, 533, 526, 152/554, 525, 555, 546

[56] References Cited

U.S. PATENT DOCUMENTS

| | | | |
|---|---|---|---|
| 3,557,858 | 1/1971 | Lugli | 152/531 X |
| 3,677,319 | 7/1972 | Mirtain | 152/531 X |
| 3,703,202 | 11/1972 | Maiocchi | 152/531 X |
| 4,688,615 | 8/1987 | Lee | 152/531 |
| 4,706,724 | 11/1987 | Ohkuni et al. | 152/527 X |
| 4,745,957 | 5/1988 | Sumner | 152/531 |
| 5,176,770 | 1/1993 | Ohkuni | 152/533 X |
| 5,198,051 | 3/1993 | Suzuki et al. | 152/525 X |

FOREIGN PATENT DOCUMENTS

| | | | |
|---|---|---|---|
| 2162102 | 6/1990 | Japan | 152/525 |
| 2306802 | 12/1990 | Japan | 152/531 |
| 1487426 | 9/1977 | United Kingdom | 152/531 |
| 2064445 | 6/1981 | United Kingdom | 152/531 |

*Primary Examiner*—Michael W. Ball
*Assistant Examiner*—Adrienne C. Johnstone
*Attorney, Agent, or Firm*—Birch, Stewart, Kolasch & Birch

[57] ABSTRACT

A motorcycle radial tire includes a carcass having at least one ply of radially arranged organic fiber cords turned up around a pair of bead cores, the radial height (Ht) of the radially outer edge of the carcass turned up portions being more than 0.6 times and less than 1.2 times the radial height (Hs) of tread edges, a first belt having one cord or a plurality of parallel cords wound spirally so that the windings thereof are laid at small angles with respect to the tire equator, a second belt having one ply of parallel organic fiber cords laid at at angle of 10 to 30 degrees with respect to the tire equator, a bead apex made of rubber having a JIS(A) hardness of 65 to 75 disposed between the main portion and each turned up portion of the carcass, and the radial height (Ha) of the radially outer edge of the bead apex from the bead base line being more than 0.5 times and less than 1.2 times the radial height (Hs) of the tread edges.

3 Claims, 5 Drawing Sheets

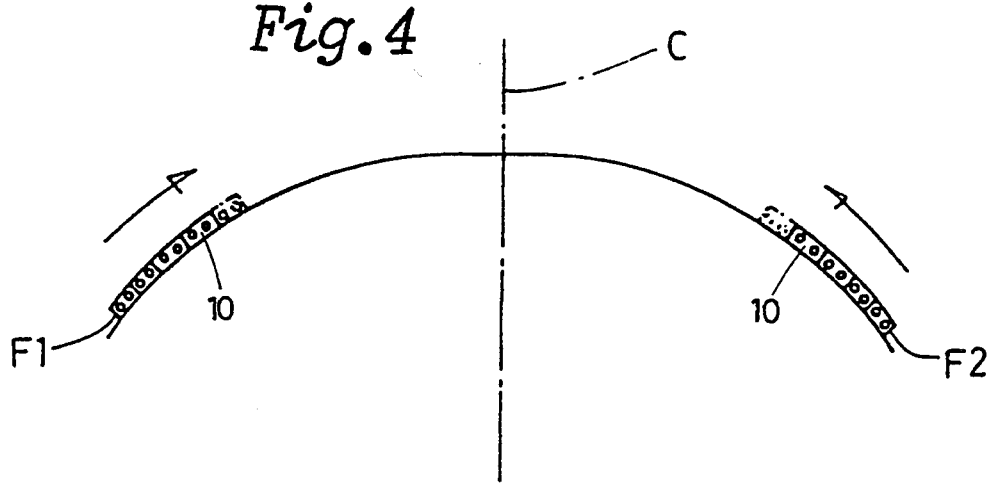
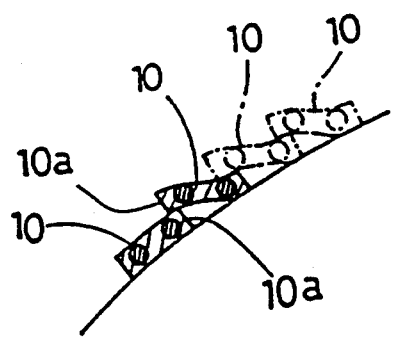
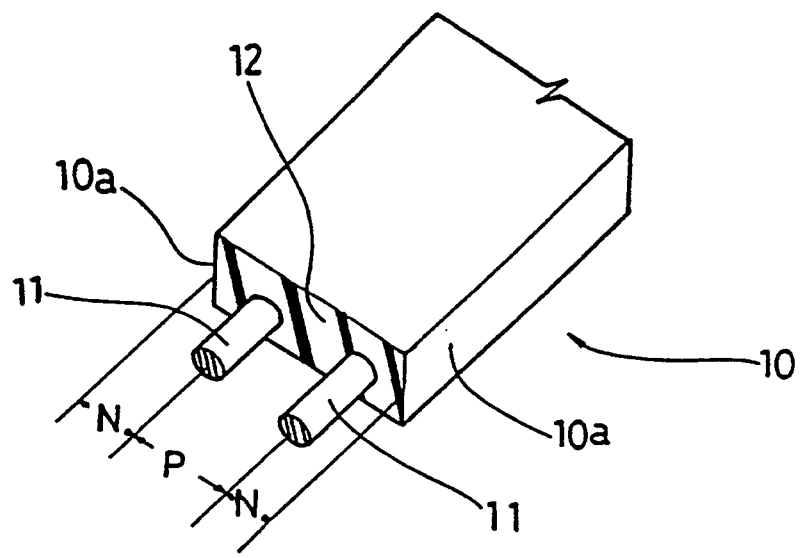

5,385,193

MOTORCYCLE RADIAL TIRE HAVING A SPIRALLY WOUND BELT

This application is a continuation of application Ser. No. 07/775,109 filed on Oct. 11, 1991, now abandoned.

FIELD OF THE INVENTION

The present invention relates to a pneumatic tire, and more particularly a belted radial tire for motorcycle use, in which high speed steering stability and durability are improved.

DESCRIPTION OF RELATED ART

In order to provide motorcycles with high-speed running stability during cornering and also straight running, a belted radial tire provided with a carcass composed of one radial ply and a single jointless belt has been proposed, wherein the jointless belt is disposed between the carcass and a rubber tread and formed by spirally winding a cord around the carcass continuously from one edge to the other edge of the belt ply.

In such a belted radial tire, since the windings of the belt cord are run almost parallel with the tire equator, the hooping force by the belt to the tire tread portion is enhanced to improve durability against high-speed running. However, for lack of lateral rigidity of the belt, the rigidity of the tread portion and shoulder portions is not effectively increased, and the tire involves a problem of slow convergence on disturbance during cornering and straight running. Further, problems of nibbling (wandering) and steering stability arise.

SUMMARY OF THE INVENTION

It is an object of the present invention to provide a motorcycle radial tire in which directional stability during high speed straight running and high speed cornering performance are improved, and at the same time a disturbance converging characteristic is improved to provide an improved maneuverability, and further resistance to nibbling can be improved.

According to one aspect of the present invention, a motorcycle radial tire comprises

- a tread curved so that the maximum cross sectional width of the tire lies between the edges of the tread,
- a pair of bead cores disposed one in each bead,
- a carcass having at least one ply of radially arranged organic fiber cords extending between the beads and turned up around the bead cores to form two turned up portions and one main portion of the carcass,
  - the radial height (Ht) of the radially outer edge of the carcass turned up portions from the bead base line being more than 0.6 times and less than 1.2 times the radial height (Hs) of tread edges from the bead base line,
- a first belt disposed radially outside the carcass and comprising one cord or a plurality of parallel cords wound spirally so that the windings thereof are laid at small angles with respect to the tire equator,
  - the cords of the first belt having an elastic modulus of not less than 600 kgf/sq. mm,
- a second belt disposed radially outside the first belt and comprising one ply of parallel organic fiber cords laid at an angle of 10 to 30 degrees with respect to the tire equator,
- a bead apex disposed between the main portion and each turned up portion of the carcass and extending radially outwardly from the bead core,
  - the bead apex made of rubber having a JIS(A) hardness of 65 to 75,
  - the radial height (Ha) of the radially outer edge of the bead apex from the bead base line being more than 0.5 times and less than 1.2 times the radial height (Hs) of the tread edges.

BRIEF DESCRIPTION OF THE DRAWINGS

Embodiments of the present invention will now be described in detail in conjunction with the accompanying drawings, in which:

FIG. 3 is an enlarged perspective view of a ribbon of rubber for making the jointless belt thereof;

FIG. 4 is a cross sectional view showing an example of winding the ribbon of rubber;

FIG. 5 is a cross sectional view showing another example of winding the ribbon of rubber;

DETAILED DESCRIPTION OF PREFERRED EMBODIMENTS

Figure 1:
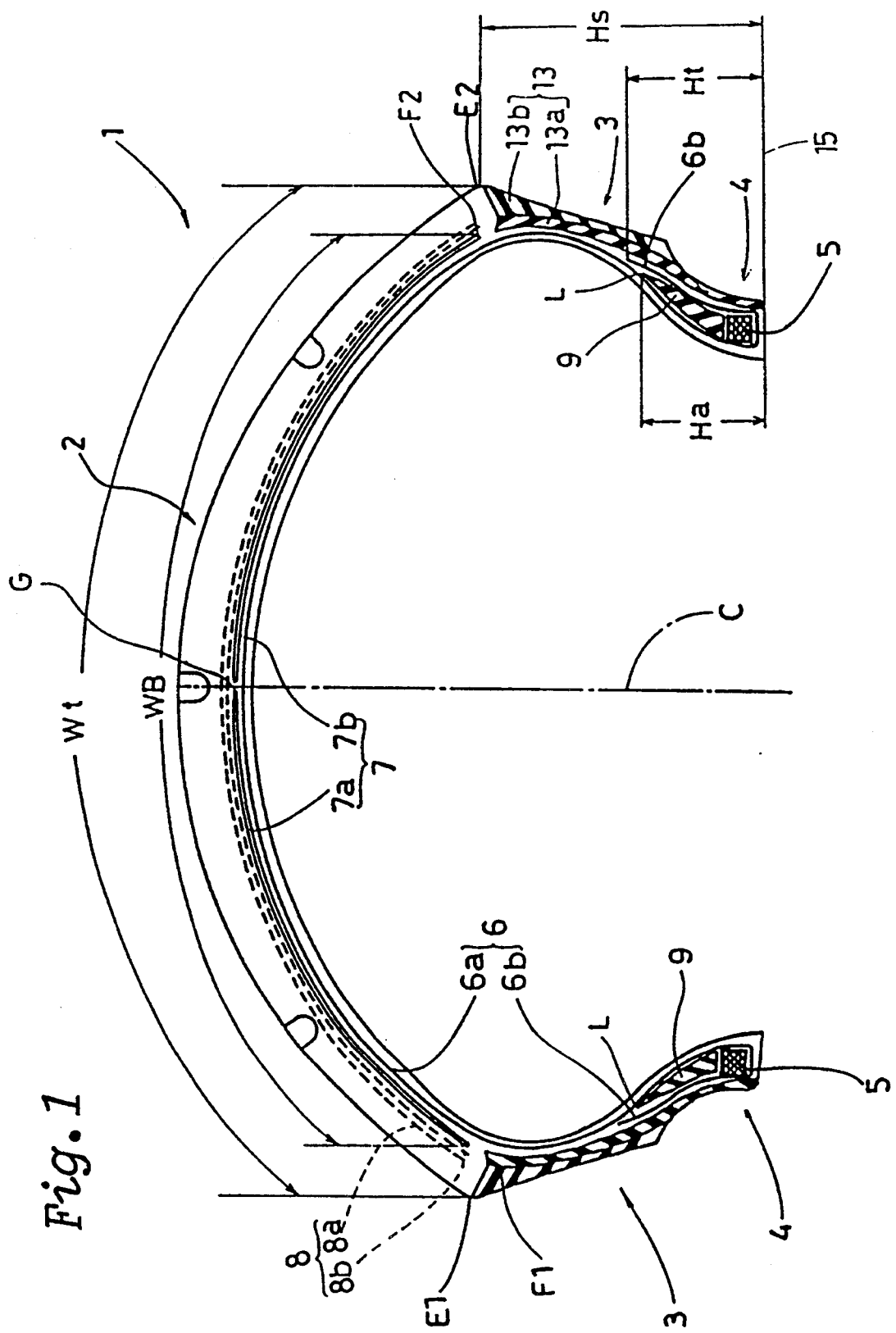
FIG. 1 is a cross sectional view of a tire according to the present invention.

In the figures, motorcycle radial tire 1 has a tread 2, a pair of axially spaced beads 4, and a pair of sidewalls 3 extending radially inwardly from the edges E1 and E2 of the tread to the beads.

The tire 1 comprises a pair of bead cores 5 one disposed in each bead 4, a carcass 6 extending between the beads 4 and turned up around the bead cores 5 from the axially inside to outside thereof to form two turned up portions 6b and one main portion 6a of the carcass, and belts 7 and 8 disposed radially outside the carcass and inside the tread.

The carcass 6 has at least one ply of cords arranged radially of the tire at an angle of 60 to 90 degrees with respect to the tire equator C.

For the carcass cords, organic fiber cords, e.g. nylon, rayon, polyester, aromatic polyamide and the like are used.

The radial height Ht of the radially outer edge of the above-mentioned carcass turned up portions 6b is more than 0.6 times and less than 1.2 times the radial height Hs of the tread edges E1 and E2, both measured from the bead base line 15. If the height Ht is not more than 0.6 times the tread edge height Hs, the lateral stiffness of the sidewalls becomes reduced, and the sidewalls are subjected to bending stress to lower the durability, and further the steering response is impaired. If the height Ht is more than 1.2 times Hs, the rigidity of the sidewalls is too increased to maintain the ride comfort. Further, such a higher turnup is not preferable in respect of the weight of the tire.

Between each carcass turned up portion 6b and the carcass main portion 6a, a bead apex 9 made of hard rubber is disposed.

The bead apex 9 extends taperingly radially outwardly from the bead core 5.

The radial height Ha of the radially outer edge L of the bead apex from the bead base line 15 is more than 0.5 times and less than 1.2 times the above-mentioned height Hs of the tread edge.

If the height Ha is not more than 0.5 times the height Hs, the bending rigidity of the beads is decreased, and the bead durability is lost.

A rubber tread is disposed radially outside the crown portion of the carcass to define the tread 2. The tread 2 is curved so that the maximum tire cross section width lies between the tread edges E1 and E2.

A pair of rubber sidewalls 13 are disposed axially outside the carcass 6 to define the sidewall portions 3. Each sidewall 13 has a double-layered structure which comprises an axially inner sidewall 13a made of hard rubber and an axially outer sidewall 13b made of softer rubber, and the sidewall 13 extends between the bead 4 and the tread edge E1, E2.

Figure 6:
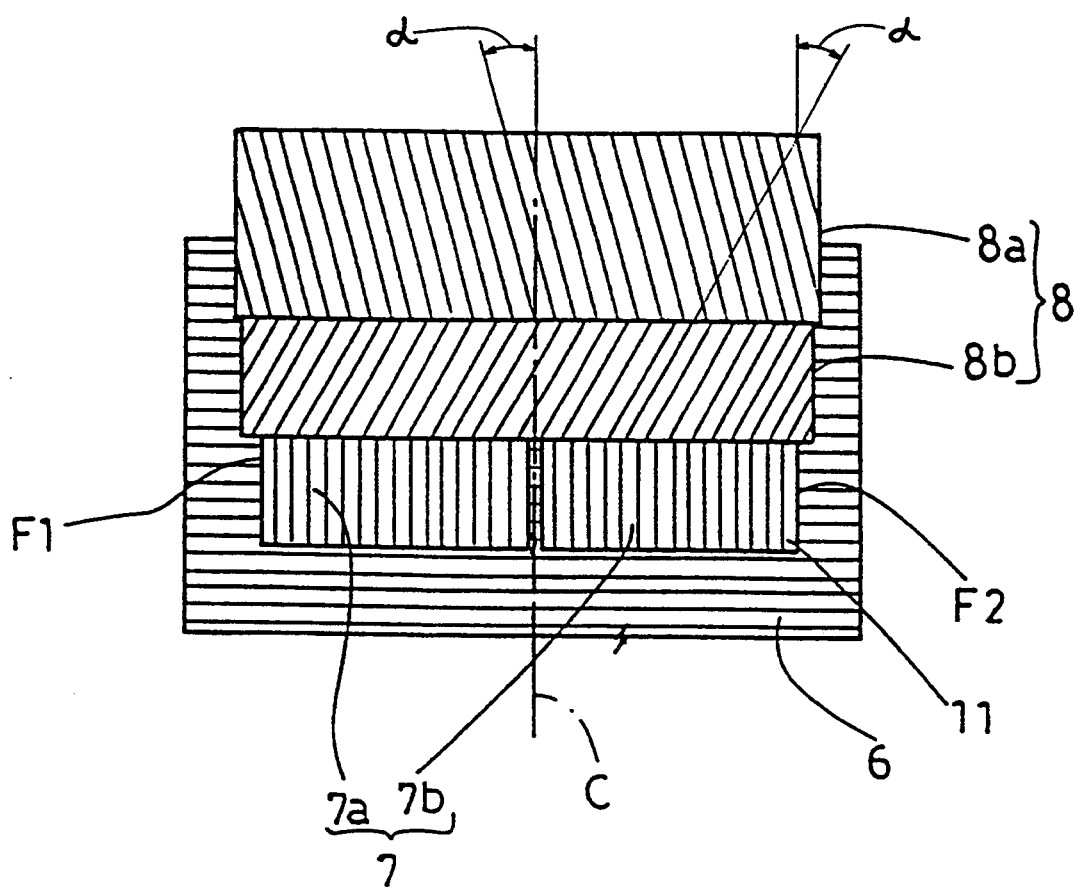
FIG. 6 is a developed plan view showing the arrangement of the carcass, jointless belt and breaker belt in the tire of FIG. 1.

The belts in the example shown in FIGS. 1 and 6 are a jointless belt 7 disposed on the radially outside of the carcass 6 and a breaker belt 8 comprising a radially outer ply 8a and a radially inner ply 8b both disposed radially outside the jointless belt 7.

Figure 2:
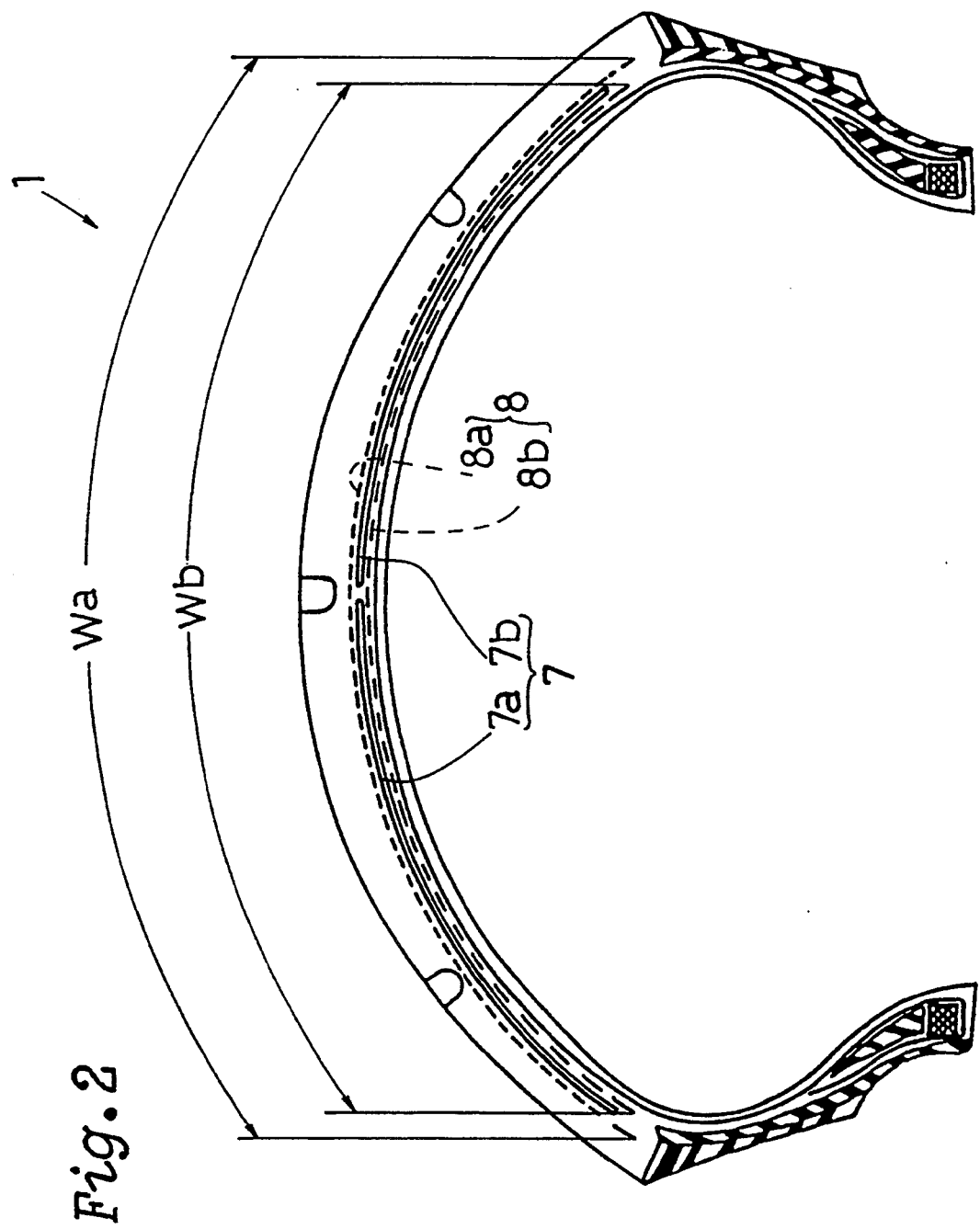
FIG. 2 is a cross sectional view of another tire according to the present invention.
Figure 7:
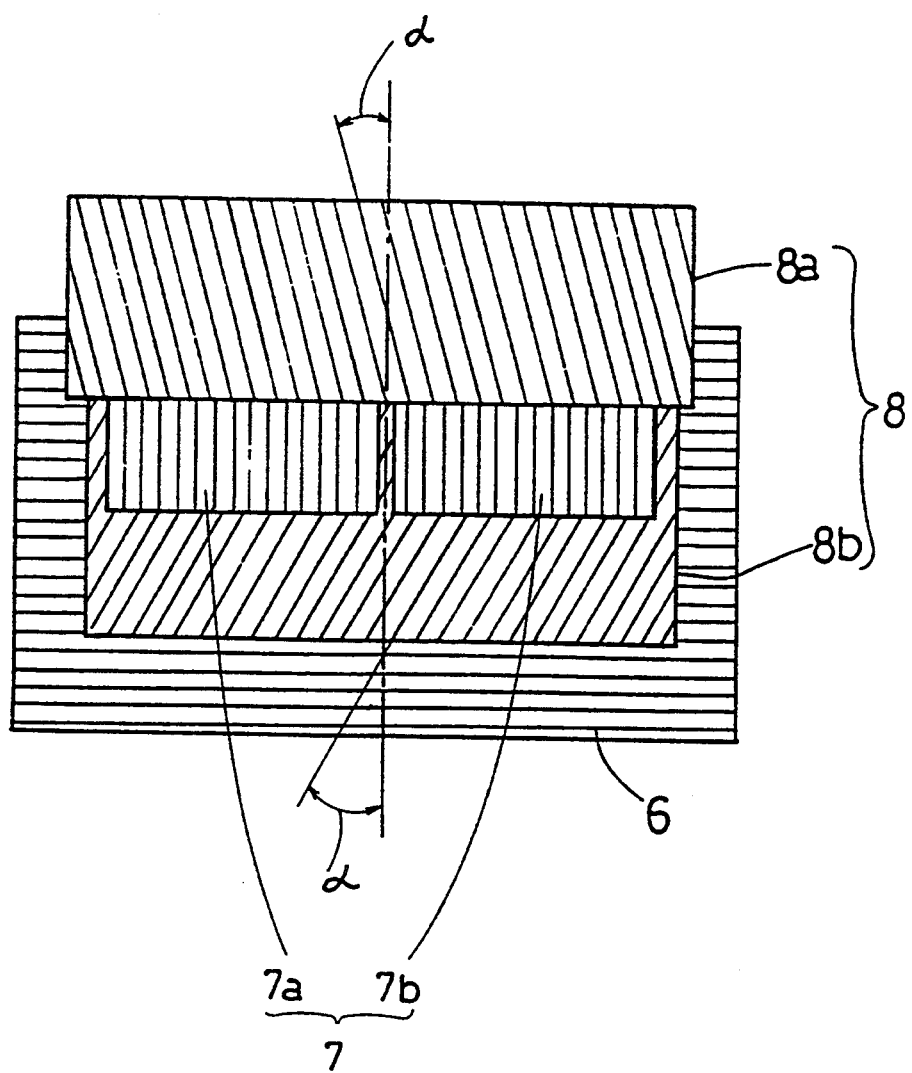
FIG. 7 is a developed plan view showing the arrangement of the carcass, jointless belt and breaker belt in the tire of FIG. 2.

The belts in another example shown in FIGS. 2 and 7 are a jointless belt 7 and a breaker belt 8 comprising a radially inner ply 8b disposed on the radially outside of the carcass 6 and a radially outer ply 8a disposed radially outside the ply 8b, wherein the jointless belt 7 is disposed between the radially outside and inside plies 8a and 8b.

The jointless belt 7 is formed by spirally winding at least one ribbon 10 of rubber. In FIG. 1, ribbons are wound on the carcass. In FIG. 2, ribbons are wound on the previously applied breaker belt 8b.

FIG. 3 shows the ribbon 10, in which one belt cord or a plurality of parallel belt cords, in this example two parallel cords 11, are embedded in rubber 12 along its longitudinal direction.

For the belt cords 11, organic fiber cords, e.g. Teflon, aromatic polyamide, polyester and the like, or steel cords, having a high modulus of elasticity of not less than 600 kgf/sq. mm are used.

Preferably, aromatic polyamide fiber cords are used for their high modulus.

If the elastic modulus is less than 600 kgf/sq. mm, the tread portion is not effectively reinforced, and high speed running performance and high speed durability are deteriorated.

In this example, the ribbon 10 has a flat rectangular cross sectional shape, and the distance N measured from each of the side edges 10a to the center of the adjacent cord 11 is set to be not more than ½ of the belt cord pitch P.

In each of the embodiments shown in FIGS. 1 and 2, the jointless belt 7 comprises two axially divided pieces 7a and 7b disposed one on each side of the tire equator C.

In order to form those two pieces, two ribbons 10 are used. As shown in FIG. 4, each ribbon is wound spirally and continuously from a start point F1, F2 near the tread edge E1, E2 to an end point G on or near the tire equator C so that the belt cords 11 are laid at small angles of 0 to 5 degrees with respect to the tire equator C.

In the embodiment shown in FIG. 1, the ribbons are wound around the crown portion of the carcass 6. In the embodiment shown in FIG. 2, the ribbons are wound around the radially inner breaker ply 8b.

In FIG. 4, the windings of each ribbon are not overlapped. It is however, possible to overlap the side edges 10a of the windings with each other as shown in FIG. 5 to prevent the windings from being loosened at especially the starting point of winding, whereby a ply separation failure at the jointless belt edges is reduced. To smoothly overlap the edges 10a, the edges 10a of the ribbon are preferably tapered.

In the above-mentioned belt 7, the windings of the ribbon 10 or the windings of the belt cords 11 in one belt piece 7a are laid at the same inclination angle as the other belt piece 7b, but in the opposite direction with respect to the tire equator C.

By winding two ribbons 10 simultaneously to form the belt pieces 7a and 7b, the time to make the belt 7 is greatly reduced in comparison with a one-piece jointless belt.

As the belt pieces 7a and 7b are formed by winding ribbons starting from the axially outer edges F1 and F2 toward the tire equator, the loosening of the windings of the ribbon 10 especially at the edges can be prevented.

In this embodiment, the width WB of the jointless belt 7 measured along the belt 7 between the edges thereof is more than 0.7 times and less than 1.0 times the width Wt of the tread 2 measured along the tread face between the tread edges E1 and E2. When the width WB is not more than 0.7 times Wt, the stiffness of the tread shoulder region is decreased to lower the steering stability in a quick turn.

When the width WB is not less than 1.0 times Wt, the rigidity of the sidewalls is excessively increased to deteriorate ride comfort.

More preferable the width WB is more than 0.85 times and less than 0.90 times the width Wt.

In the above-mentioned breaker belt 8, each ply 8a, 8b is formed by winding a strip of unwoven fabric having the full width, and the breaker cords in each ply are arranged at an angle (alpha) of 10 to 30 degrees with respect to the tire equator C and in parallel with each other but crosswise to the breaker cords in the other ply.

For the breaker cords, organic fiber cords, e.g. nylon and the like having a lower elastic modulus in comparison with the above-mentioned belt cords 11 are used.

The widths Wa and Wb of the radially inner and outer breaker plies 8a and 8b, respectively, are 2 to 5 mm larger than the width WB of the jointless belt 7.

Test tires of size 170/60VR17 having the tire structure shown in FIG. 1 and specifications given in Table 1 were prepared and tested for the following tire performance.

1) High Speed Straight Running Stability and High Speed Cornering Stability

A motorcycle provided on the rear wheel with the test tire was run on a straight course at 260 km/Hr and a 400 m radius curved course at 220 km/Hr, and then running stability was evaluated by a skilled test driver.

The stability is indicated by an index based on the assumption that Reference tire 1 is 100. The larger the value, the better the stability.

2) Convergence (Steering Stability)

Convergence at disturbance during cornering and straight running was evaluated by the skilled test driver.

3) High Speed Durability

Using a drum tire tester, running speed was increased every 10 minutes at a step of 10 km/Hr from an initial speed of 250 km/Hr, and the running distance until the tread or beads were cracked was measured. The tire pressure was 3.0 kgf/sq. mm, and the tire load was 355 kg.

The durability is indicated by an index based on the assumption that Reference tire 1 is 100. The larger the value, the better the durability.

4) Resistance to Nibbling (Resistance to Wandering)

While running on a test course provided with rain grooves and projections at a speed of 200 km/Hr, the resistance to nibbling was evaluated by the test driver.

Incidentally, in the above-mentioned tests, a 120/70R17 tire was used for the front wheel. The specifications thereof are given in Table 2.

Through the tests, it was confirmed that working Example tires were superior in all respects (steering stability, high-speed running stability and resistance to nibbling, and further high-speed durability) to Reference tires.

In the above-mentioned two embodiments, the spiral winding directions in the belt pieces 7a and 7b are different from each other, but they may be in the same direction.

Further, the jointless belt may be formed by winding one ribbon 10 spirally and continuously from one edge to the other edge thereof.

TABLE 1

|  | Ex. 1 | Ex. 2 | Ex. 3 | Ex. 4 | Ref. 1 | Ref. 2 | Ref. 3 | Ref. 4 | Ref. 5 | Ref. 6 | Ref. 7 |
| --- | --- | --- | --- | --- | --- | --- | --- | --- | --- | --- | --- |
| Carcass | | | | | | | | | | | |
| No. of ply | 1 | 1 | 1 | 2 | 1 | 1 | 1 | 1 | 1 | 1 | 1 |
| Cord | nylon 2/1260d | nylon 2/1260d | nylon 2/1260d | nylon 2/1260d | nylon 2/1260d | nylon 2/1260d | nylon 2/1260d | nylon 2/1260d | nylon 2/1260d | nylon 2/1260d | nylon 2/1260d |
| Cord count (ends/5 cm) | 51 | 51 | 51 | 51 | 51 | 51 | 51 | 51 | 51 | 51 | 51 |
| Cord angle (deg.) | 90 | 90 | 70 | 88 | 90 | 90 | 90 | 90 | 90 | 90 | 65 |
| Ht/Hs | 0.6 | 1.2 | 1.0 | 1.0 | 0.5 | 1.3 | 1.2 | 1.2 | 1.2 | 1.2 | 1.2 |
| Endless belt | | | | | | | | | | | |
| No. of ply | 1 | 1 | 1 | 1 | 2 | 2 | 1 | 1 | 1 | 1 | 1 |
| Cord | aramid 3/1500d | aramid 3/1500d | aramid 3/1500d | aramid 3/1500d | aramid 3/1500d | aramid 3/1500d | aramid 3/1500d | aramid 3/1500d | aramid 3/1500d | aramid 3/1500d | aramid 3/1500d |
| Cord count (ends/5 cm) | 45 | 45 | 45 | 45 | 45 | 45 | 45 | 45 | 45 | 45 | 45 |
| Cord winding direction | Right | Left | Right | Left | Right | Right | Right | Right | Right | Right | Right |
| WB/Wt | 0.85 | 0.90 | 0.90 | 0.85 | 0.85 | 0.90 | 0.80 | 0.95 | 0.85 | 0.85 | 0.8 |
| No. of cords in ribbon | 2 | 2 | 2 | 1 | 2 | 2 | 2 | 2 | 2 | 2 | 2 |
| Outer breaker belt | | | | | | | | | | | |
| No. of ply | 1 | 1 | 2 | 2 |  | 1 | 2 | 2 | 1 | 1 | 1 |
| Cord | nylon 2/840d | nylon 2/840d | nylon 2/840d | nylon 2/840d |  | nylon 2/840d | nylon 2/840d | nylon 2/840d | nylon 2/840d | nylon 2/840d | nylon 2/840d |
| Cord count (ends/5 cm) | 55 | 55 | 55 | 55 |  | 55 | 55 | 55 | 55 | 55 | 55 |
| Cord angle #1 | +10 | +30 | ±18 | ±18 |  | +30 | ±8 | ±33 | +10 | +30 | −10 |
| Width Wa (mm) | WB + 4 | WB + 10 | WB + 3 | WB + 6 & + 8 |  | WB + 2 | WB | WB | WB + 3 | WB | WB |
| Inner breaker belt | | | | | | | | | | | |
| No. of ply | 1 |  |  | 1 |  |  |  |  |  |  |  |
| Cord | nylon 2/840d |  |  | nylon 2/840d |  |  |  |  |  |  |  |
| Cord count (ends/5 cm) | 55 |  |  | 55 |  |  |  |  |  |  |  |
| Cord angle #1 | −10 |  |  | +18 |  |  |  |  |  |  |  |
| Width Wb (mm) | WB + 4 |  |  | WB + 4 |  |  |  |  |  |  |  |
| Bead apex | | | | | | | | | | | |
| JIS A hardness | 65 | 75 | 65 | 65 | 65 | 75 | 78 | 63 | 78 | 65 | 65 |
| Ha/Hs | 0.5 | 1.2 | 0.8 | 1.0 | 0.4 | 1.3 | 1.2 | 1.0 | 1.2 | 1.2 | 1.2 |
| Convergence (steering stability) | | | | | | | | | | | |
| cornering | 110 | 105 | 110 | 110 | 100 | 109 | 105 | 105 | 108 | 105 | 105 |
| straight running | 115 | 110 | 115 | 115 | 100 | 108 | 105 | 105 | 108 | 105 | 105 |
| High speed running stability | | | | | | | | | | | |
| cornering | 115 | 110 | 115 | 115 | 100 | 103 | 105 | 105 | 105 | 105 | 108 |
| straight running | 115 | 110 | 110 | 110 | 100 | 103 | 105 | 105 | 105 | 105 | 108 |
| High speed durability | 125 | 120 | 120 | 120 | 100 | 103 | 105 | 105 | 105 | 105 | 100 |
| Resistance to nibbling | 120 | 110 | 120 | 110 | 100 | 103 | 105 | 105 | 105 | 105 | 105 |

1:
plus sign (+) means a right side upward inclination
minus sign (−) means a left side upward inclination

TABLE 2

| Carcass | |
| --- | --- |
| No. of ply | 2 |
| Cord | nylon 2/840d |

TABLE 2-continued

|  |  |
|---|---|
| Cord count (ends/5 cm) | 55 |
| Cord angle (deg.) | 88 |
| Ht/Hs | 0.7 |
| Belt |  |
| No. of ply | 2 |
| Cord | aramid 3/1500d |
| Cord count (ends/5 cm) | 45 |
| Cord angle (deg.) | 17 |
| Bead apex |  |
| Ha/Hs | 0.6 |

We claim:

1. A motorcycle radial tire comprising:

a tread curved so that the maximum cross sectional width of the tire lies between the edges of the tread;

a pair of bead cores one disposed in each bead;

a carcass having at least one ply of radially arranged organic fiber cords extending between the beads and turned up around the bead cores to form two turned up portions and one main portion of the carcass, the radial height (Ht) of the radially outer edge of the carcass turned up portions from the bead base line being more than 0.6 times and less than 1.2 times the radial height (Hs) of tread edges from the bead base line;

a first belt disposed radially outside the carcass and comprising one cord or a plurality of parallel cords wound spirally so that the windings thereof are laid at small angles with respect to the tire equator, the cords of the first belt having an elastic modulus of not less than 600 kgf/mm$^2$, said first belt comprising two axially divided pieces one disposed on each side of the tire equator, said two axially divided pieces extending to near the tire equator from the axially outer edges of the belt, the windings of one piece laid at an inclination being angularly the same but directionally opposite the other piece with respect to the tire equator;

a second belt disposed radially outside the first belt and comprising one ply of parallel organic fiber cords laid at an angle of 10 to 30 degrees with respect to the tire equator, wherein the width (WB) of the first belt measured therealong is more than 0.7 times and less than 1.0 times the width (Wt) of the tread measured between the tread edges along the tread face, and the width of the second belt is 2 to 5 mm larger than the width (WB) of the first belt;

a bead apex disposed between the main portion and each turned up portion of the carcass and extending radially outwardly from the bead core, the bead apex made of rubber having a JIS(A) hardness of 65 to 75, the radial height (Ha) of the radially outer edge of the bead apex from the bead base line being more than 0.5 times and less than 1.2 times the radial height (Hs) of the tread edges; and a pair of sidewalls disposed axially outside the carcass and extending between the beads and the tread edges, each said sidewall having a double-layered structure comprising an axially inner sidewall made of hard rubber and an axially outer sidewall made of softer rubber.

2. The motorcycle radial tire according to claim 1, wherein said tire is further provided with a third belt disposed between the carcass and the first belt, and the third belt comprises one ply of parallel organic fiber cords laid at an angle of 10 to 30 degrees with respect to the tire equator so that the cords thereof cross the cords of the second belt.

3. The motorcycle radial tire of claim 1, wherein said tire is further provided with a third belt disposed radially outside the second belt, and the third belt comprises one ply of parallel organic fiber cords laid at an angle of 10 to 30 degrees with respect to the tire equator so that the cords thereof cross the cords of the second belt.

* * * * *